United States Patent
Hubbard et al.

(12) 
(10) Patent No.: US 6,615,892 B2
(45) Date of Patent: *Sep. 9, 2003

(54) METHOD AND APPARATUS FOR SEAMING WIDE PANELS OF EPDM MEMBRANE TO FORM A COMPOSITE EPDM ROOFING MEMBRANE

(75) Inventors: Michael J. Hubbard, Holland, OH (US); Walter J. Kelly, Wadsworth, OH (US); Anthony Verrocchi, Akron, OH (US); Raymond J. Weinert, Macedonia, OH (US)

(73) Assignee: Omnova Solutions Inc., Fairlawn, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,140

(22) Filed: Nov. 20, 1998

(65) Prior Publication Data

US 2002/0003026 A1 Jan. 10, 2002

(51) Int. Cl.[7] ............................................. B32B 31/08
(52) U.S. Cl. ....................... 156/428; 156/516; 156/544; 156/546; 156/549
(58) Field of Search .......................... 156/71, 428, 494, 156/543, 544, 546, 549, 516, 555

(56) References Cited

U.S. PATENT DOCUMENTS

| | | | | |
|---|---|---|---|---|
| 3,065,121 A | * | 11/1962 | Andrews | 156/201 |
| 4,050,972 A | * | 9/1977 | Cardinal, Jr. | 156/71 |
| 4,337,112 A | * | 6/1982 | Hollis | 156/351 |
| 4,343,667 A | | 8/1982 | Hollis | |
| 4,737,213 A | * | 4/1988 | Paeglis et al. | 156/157 |
| 4,931,126 A | * | 6/1990 | McCarville et al. | 156/304.6 |
| 5,460,672 A | * | 10/1995 | Mallonee | 156/73.4 |
| 5,545,685 A | * | 8/1996 | Davis et al. | 524/490 |

* cited by examiner

Primary Examiner—Michael W. Ball
Assistant Examiner—John T. Haran
(74) Attorney, Agent, or Firm—Larry R. Meenan; Robert F. Rywalski (57) ABSTRACT

A method and apparatus for continuously seaming cured EPDM membrane to form a composite sheet of predetermined width and indefinite length. The method includes the steps of providing at least two rolls of cured EPDM membrane having longitudinal marginal edges and feeding the cured EPDM membrane from the at least two rolls in a first direction. The longitudinal marginal edges of the cured EPDM membranes are positioned in an overlapping relationship as the cured EPDM membranes are fed in the first direction and then the overlapping longitudinal marginal edges are continuously seamed to form a composite sheet of indefinite length.

20 Claims, 6 Drawing Sheets

METHOD AND APPARATUS FOR SEAMING WIDE PANELS OF EPDM MEMBRANE TO FORM A COMPOSITE EPDM ROOFING MEMBRANE

FIELD OF THE INVENTION

The present invention relates generally to a wide panel seaming method and apparatus for forming EPDM roofing membrane. More particularly, the present invention relates to a method and apparatus for continuously seaming cured stock wide panels of EPDM membrane to form a composite EPDM roofing membrane of predetermined width and indefinite length.

BACKGROUND OF THE INVENTION

EPDM is used as a single ply roofing membrane material for covering industrial and commercial flat roofs. EPDM roofing membrane having a thickness between $\frac{1}{16}$ inch and $\frac{3}{32}$ inch has been found to constitute an extremely useful waterproof roofing material, particularly for industrial and commercial buildings having relatively flat roofs of very large size. Such membranes are generally applied to the roof surface in a vulcanized or cured state. Because of outstanding weathering resistance and flexibility, cured EPDM based roofing membrane has rapidly gained acceptance. Notwithstanding the wide acceptance of EPDM based roofing membrane, a disadvantage of utilizing these elastomers is the lack of adhesion of EPDM, especially cured EPDM, to itself. Application of cured EPDM roofing membrane is typically highly labor intensive because, in applying sheets of EPDM roofing membrane to a roof, it is usually necessary to splice cured sheets of EPDM roofing membrane together.

Typically, the roofing material comes in rolls and is rolled on in strips running the length of the building with a slight overlap between adjacent strips to provide a lap joint. Unfortunately, in the past such roofing material has typically been available only in rolls of relatively narrow width, for example, four feet wide. For a roof of large dimensions, such as 200 feet by 400 feet, the time required to apply the roofing material strips of narrow width becomes excessive and, in light of today's high labor casts, relatively expensive. To reduce the application time, and hence the cost, of roofing with EPDM sheet stock, it is desirable to provide the sheet stock in rolls of very large width, such as forty feet or more wide. With sheet stock of such width, a roof measuring 200 feet by 400 feet can be applied in five 40-foot by 200-foot strips. The time required to roof a building in this manner is a mere fraction, of that previously necessary with sheet stock of narrower width, e.g., 4 feet wide. This invention relates to a method and apparatus for providing indefinite length stock of very large width synthetic rubber sheeting, e.g., EPDM membrane, from indefinite length stock of relatively narrower width.

Accordingly, it is an object of this invention to provide indefinite length sheet stock of synthetic rubber of extremely large width, e.g., forty feet or more. This object has been accomplished in accordance with certain of the principles of this invention by providing means to feed out in a horizontal direction from a feed roll or the like, a plurality of rolls of stock synthetic rubber roofing, the length being equal to the length of the desired final stock and the width being equal to the combined width of the rolls.

SUMMARY OF THE INVENTION

Briefly, according to the present invention there is provided a method of continuously seaming cured wide panels of EPDM membrane to form a composite sheet of predetermined width and indefinite length. The method includes the steps of providing at least two rolls of wide panels of cured EPDM membrane having longitudinal marginal edges and feeding the wide panels of cured EPDM roofing membranes from the at least two rolls of stock roofing membrane in a first direction. The longitudinal marginal edges of the wide panels of cured EPDM membranes are positioned in an overlapping relationship as the wide panels of cured EPDM membranes are fed in the first direction and then the overlapping longitudinal marginal edges are continuously seamed to form a composite sheet of EPDM roofing membrane of indefinite length.

The apparatus for continuously seaming wide panels of cured EPDM membrane to form a composite roofing membrane of predetermined width and indefinite length includes at least two supply stations, a seaming station and a storage station. The at least two supply stations supply and simultaneously position indefinite length stock of wide panel cured EPDM membrane in an overlapping relationship. The seaming station continuously seams the overlapping cured EPDM membranes to form a composite roofing membrane of predetermined width and indefinite length and the storage station continuously reels the composite roofing membrane for storage.

DESCRIPTION OF THE DRAWINGS

These and other features, advantages, and objectives of the invention will become more readily apparent from a detailed description thereof taken in conjunction with the drawings in which.

DESCRIPTION OF THE PREFERRED EMBODIMENTS

Referring to the drawings wherein like reference characters represent like elements there is shown an apparatus 10 for forming a composite roofing membrane 12 of cured EPDM membrane 14. The apparatus 10 of the present invention is designed to form an indefinite length composite roofing membrane 12 of predetermined width, for example, 100 feet, from an indefinite length panel of much smaller width, e.g., 10 feet. A 100 foot wide roll of composite roofing membrane 12 is more convenient and useful in covering very large surfaces such as the roof of a large building. The time required to cover a large roof with conventional roofing membrane of relatively narrower width is many times that required to cover the same roof with composite roofing membrane formed in accordance with the present invention.

Figure 3:
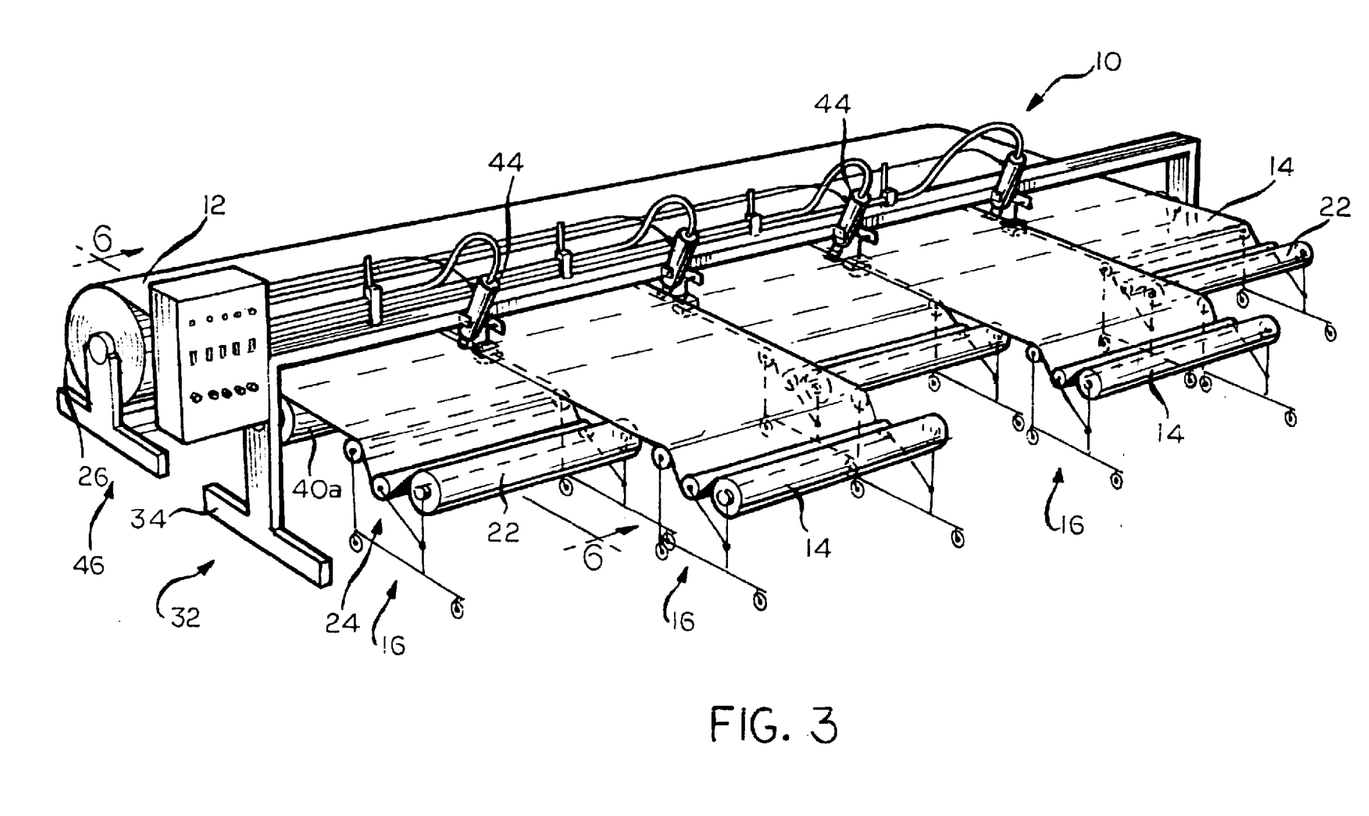
FIG. 3 is a perspective view of an apparatus for seaming wide panels of EPDM membrane in accordance with one aspect of the present invention.
Figure 4:
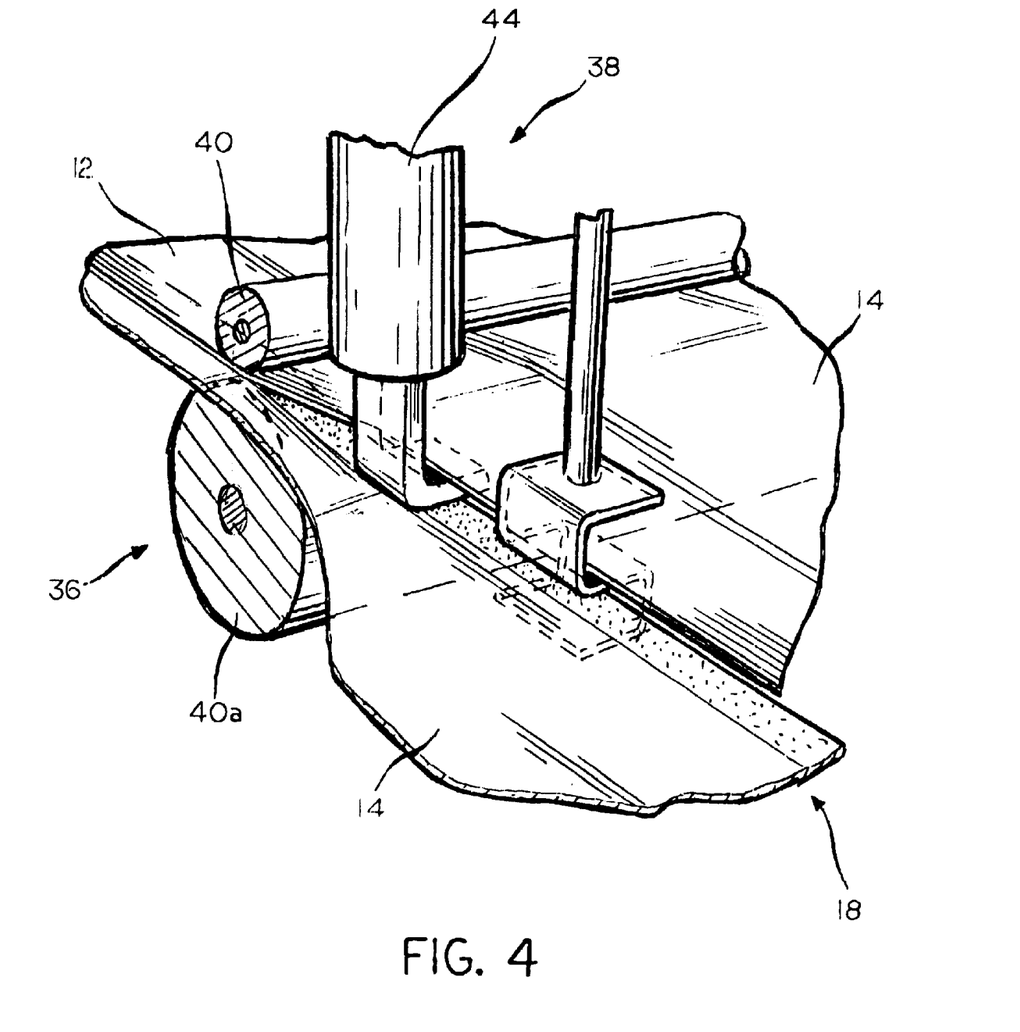
FIG. 4 is an enlarged partial perspective view of a seaming station of the apparatus of FIG. 3.
Figure 5:
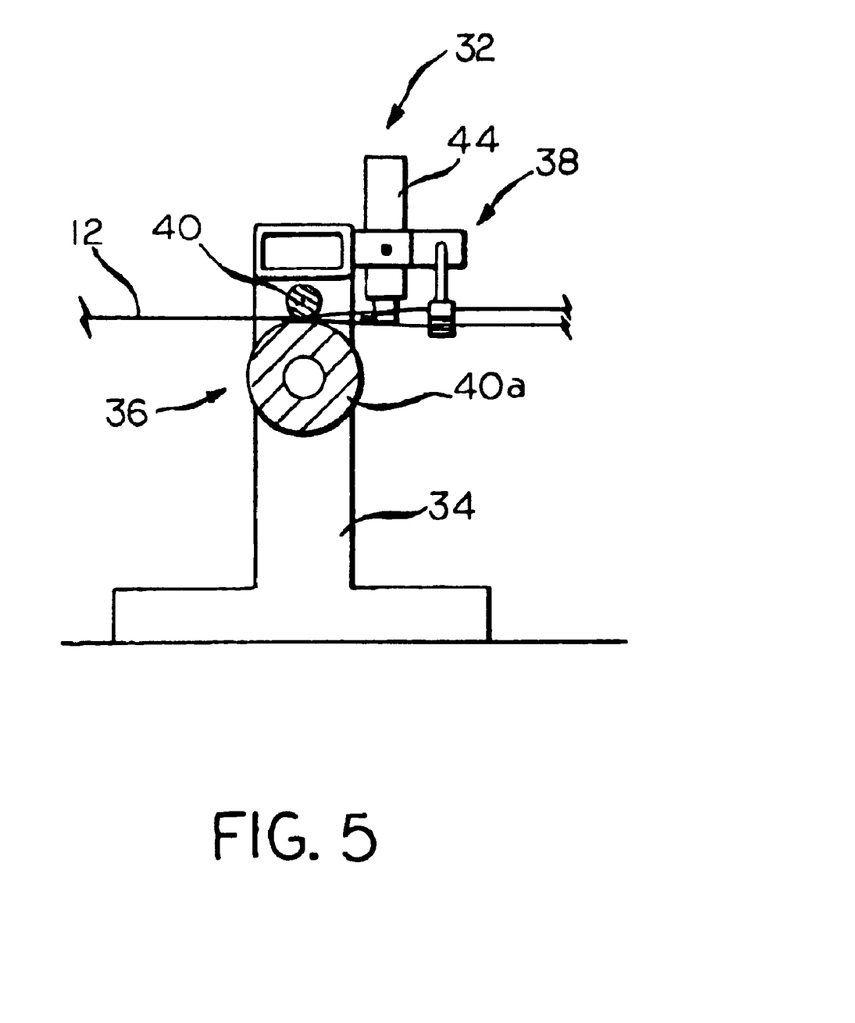
FIG. 5 is a cross-sectional view of the seaming station of the apparatus of FIG. 3 for applying adhesive between the wide panels of EPDM membrane.
Figure 6:
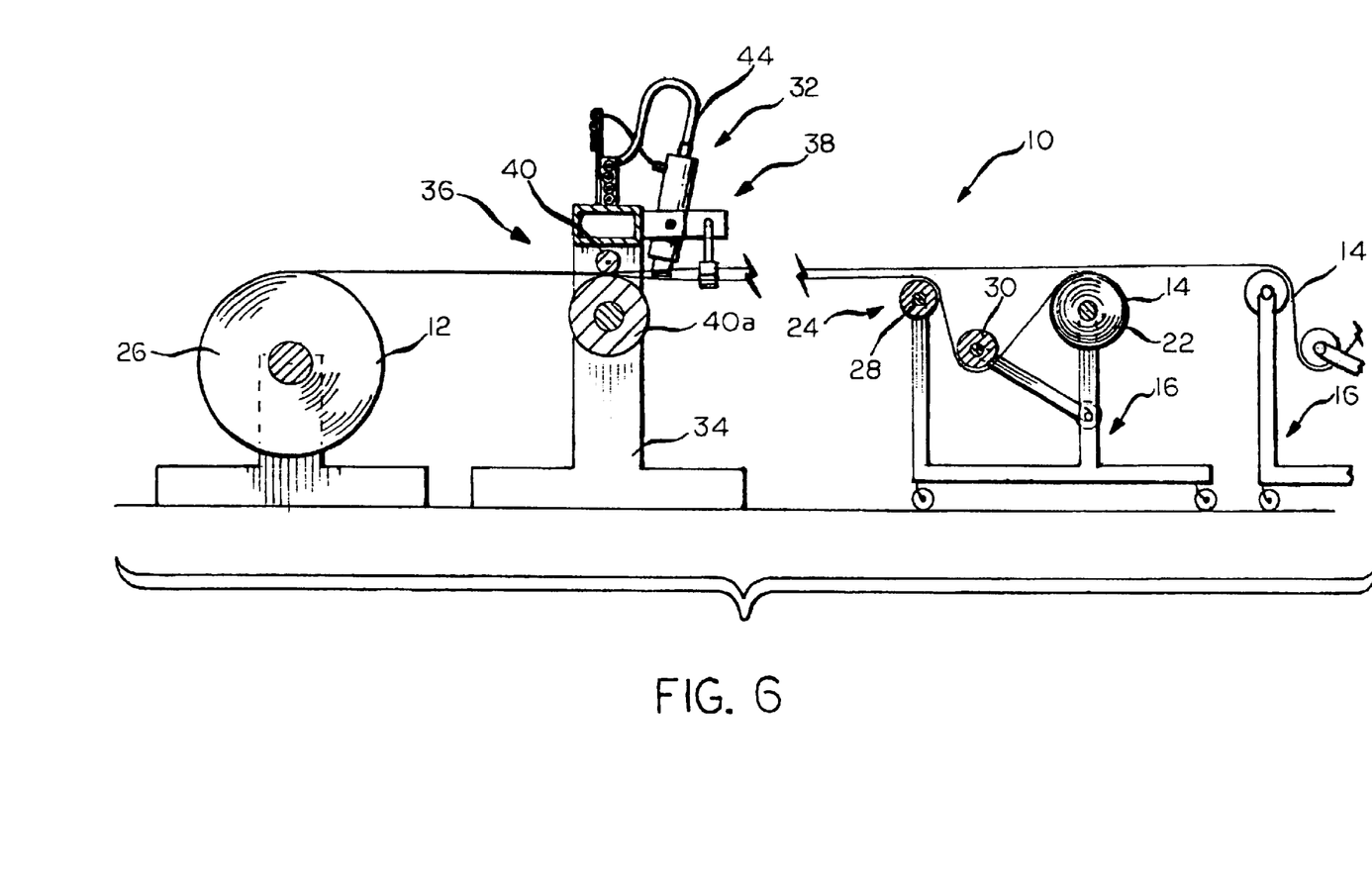
FIG. 6 is a cross-sectional view of the apparatus of FIG. 3.
Figure 7:
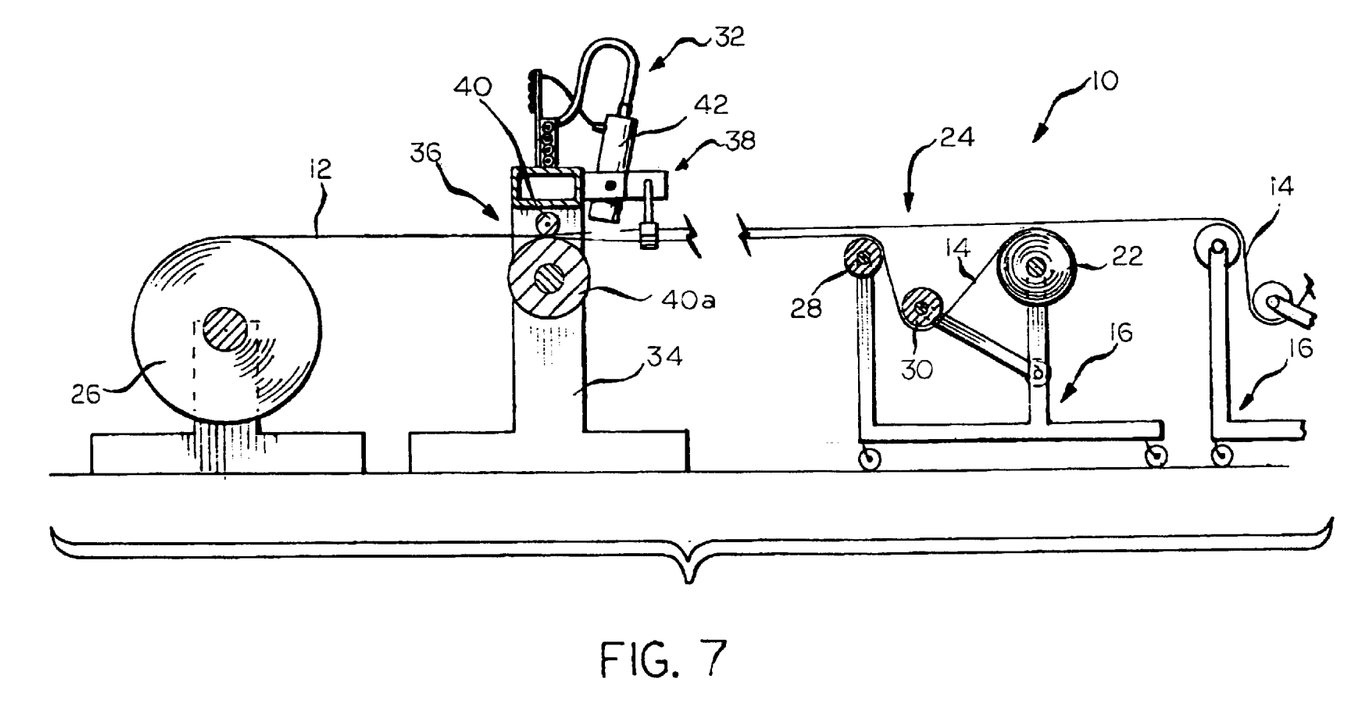
FIG. 7 is a cross-sectional view of an alternate embodiment of an apparatus for seaming wide panels of EPDM membrane in accordance with another aspect of the present invention.

Referring to the figures, an apparatus 10 for forming an indefinite length composite roofing membrane 12 is shown. The apparatus 10 includes at least two supply stations 16 which supply indefinite length stock of wide panel cured EPDM membrane 14 or other similar olefin type polymers (FIGS. 3, 6 and 7). The term "EPDM" is intended to mean a terpolymer of ethylene, propylene and a diene monomer.

Figure 1:
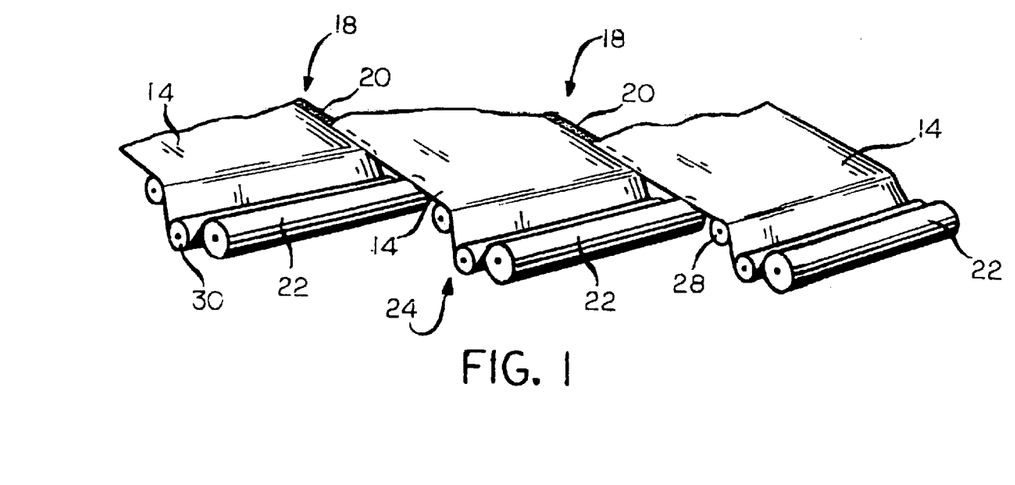
FIG. 1 is a perspective view of three rolls of overlapping cured stock wide panels of EPDM roofing membrane containing an adhesive along the top marginal edge.
Figure 2:
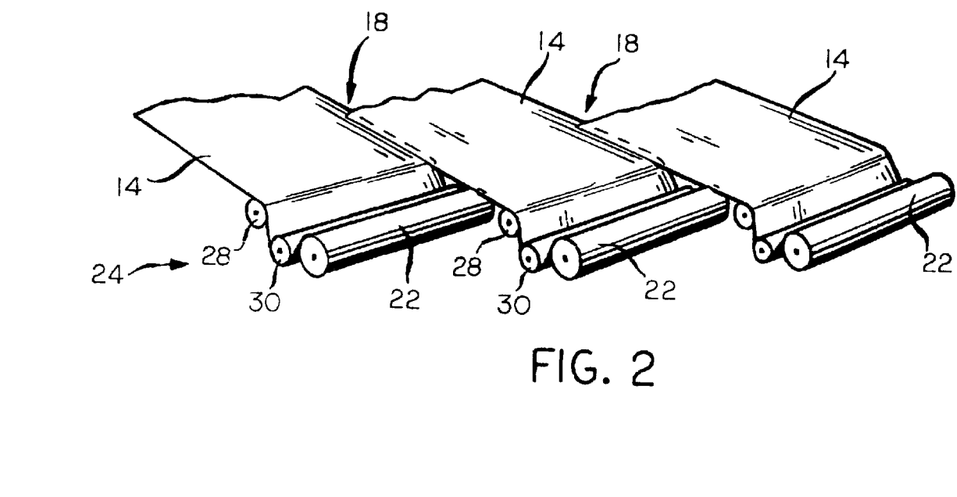
FIG. 2 is a perspective view of three rolls of overlapping adhesive free cured stock wide panels of EPDM roofing membrane.

In one embodiment, at least one marginal edge 18 of the cured EPDM membrane 14 includes a preapplied adhesive 20 (FIG. 1). The adhesive 20 may be a thermoplastic elastomer (TPE), thermoplastic polyolefin (TPO) or suitable thermoplastic adhesive of a type well known in the art. The term "thermoplastic elastomer" refers to an elastomer that can be melt-processed (as contrasted with conventional cross-linked rubbers). The term "thermoplastic polyolefin" refers to uncrosslinked polyolefins that are thermoplastic. The thermoplastic polyolefins are made by blending ethylene-propylene polymers with polypropylene. The ethylene-propylene polymers may be blended with polypropylene by conventional mixing techniques. In an alternate embodiment, ethylene-propylene and polypropylene are made in a reactor simultaneously creating a homogenous mixture. The polymer is formulated with stabilizers, pigments and antioxidants to obtain the appropriate adhesive properties. Preferred TPO's include ethylene-propylene rubber blended with polypropylene. The TPE's and TPO's can be applied using conventional plastic techniques, such as extrusion and the like. In yet another embodiment, the cured EPDM membrane 14 is free of adhesive (FIG. 2).

The supply station 16 includes a supply roll 22 containing cured EPDM membrane 14 of indefinite length and selected width wound on a horizontal mandrel. The mandrel is suitably journaled for rotation about its respective horizontal axis. The supply station 16 also includes a tensioning device 24 to maintain a constant tension on the cured EPDM membrane 14 as the membrane is fed from the supply roll 22 to a storage roll 26. In a preferred embodiment, the tensioning device 24 includes an array of rollers suitably supported for rotation about their respective longitudinal axes. As shown in FIG. 3, the tensioning device 24 includes a support roll 28 that supports the cured EPDM membrane 14 as the membrane is fed from the supply roll 22 and a tensioning roll 30 pivotally connected to maintain a downward pressure on the cured EPDM membrane between the supply roll and the support roll.

The supply station 16 feeds out a selected length of cured EPDM membrane 14 in the direction of the seaming station 32. As shown in FIGS. 1–3, the supply stations 16 are arranged in an overlapping manner to facilitate the overlapping of cured EPDM membrane. The supply stations 16 may be arranged in an alternating overlapping arrangement (FIG. 3) or in a step-wise arrangement (FIGS. 1 and 2).

The seaming station 32, FIGS. 3–7, includes a frame member 34 supporting a press assembly 36 and a device 38 for seaming the overlapping cured EPDM membranes 14. In a preferred embodiment, the press assembly 36 includes pinch rollers 40 and 40a suitably supported for rotation about their respective longitudinal axes. As the overlapping edges of the cured EPDM membranes 14 pass between pinch rollers 40 and 40a, the opposing pinch rollers compress the overlapping edges thereby securing the membranes together to form a seam and enhancing the permanency of the seam. It will be appreciated that the overlapping edges of the cured EPDM membranes 14 may be compressed using most any suitable apparatus as well known in the art.

In one embodiment as shown in FIG. 7, the device 38 for seaming the overlapping cured EPDM membranes 14 includes a plurality of hot air guns 42 of a type well known in the roofing membrane art. It will be appreciated that a hot air gun 42 is used to operatively seam a roofing membrane specially manufactured to include a preapplied adhesive of the type described above to an opposing roofing membrane. The hot air gun 42 is operatively attached to the frame member 34 above the overlapping edges and directed at the overlapping edges to heat the area of overlap to weld the overlapping cured EPDM membranes together and form a seam.

In yet another embodiment as shown in FIGS. 3–6, wherein the cured EPDM roofing membrane does not contain a preapplied adhesive, the device 38 for seaming the overlapping cured EPDM membranes 14 includes an adhesive applicator 44 which applies adhesive to the marginal edge region of the upper surface of a lower wide panel of cured EPDM membrane and/or to the marginal edge region of the bottom surface of the upper wide panel of cured EPDM membrane as it is fed through the adhesive applicator. Any commercially available hot melt adhesive applicator 44, such as available from Norton or Pyles, can be utilized. The adhesive applicator 44 may terminate flow of the adhesive from the applicator when the membrane is stopped to avoid undesired accumulation of adhesive on the cured EPDM membrane. The adhesive applicator 44 also prevents adhesive 20 from being dispensed from the applicator when no cured EPDM membrane 14 is present, whether or not the apparatus 10 is actually in operation.

The formed composite roofing membrane 12 from the seaming station 32 is then conveyed to a storage station 46 (FIGS. 6 and 7). The storage station 46 includes a rotatable take-up roll 48 onto which the composite roofing membrane 12 is rolled for storage purposes. Following reeling of the composite roofing membrane 12 on the take-up roll 48 at the storage station 46, the take-up roll 48 is transported for use on a roof deck or for storage and later application to a roof deck as described above. The take-up roll 48 is motor-driven to convey the cured EPDM membrane 14 from the supply roll 22 to the storage roll 28. The speed and operation of the take-up roll 48 is controlled from a control panel.

The composite roofing membrane 12 may be cut to a desired length by a roofing membrane cutter (not shown) of a type well known in the art. The cutter may be used to cut transversely across the fed-out composite roofing membrane 12 when a desired length has been fed past the seaming station 32 for the purpose of providing a cut sheet of desired length and width.

It will be appreciated that an important aspect of this invention inheres in the fact that any number of wide panel cured EPDM membranes 14 may be continuously joined together to form one large composite EPDM roofing membrane 12. Furthermore, a plurality of wider panel cured EPDM membranes may be joined simultaneously on the apparatus 10 to form separate larger composite EPDM roofing membranes.

The documents and patents described herein are hereby incorporated by reference.

Having described presently preferred embodiments of the present invention, the invention may be otherwise embodies within the scope of the appended claims.

What is claimed is:

1. An apparatus for continuously seaming wide panels of cured EPDM membrane to form a composite roofing membrane of predetermined width and indefinite length comprising:
   at least two supply stations, each supply station including a supply roll of cured EPDM membrane wound on a mandrel positioned in overlapping relation to an adjacent mandrel for supplying and simultaneously positioning indefinite length cured EPDM membrane in an overlapping relationship;
   a seaming station including a frame member supporting a press assembly and a device for seaming the overlapping cured EPDM membranes, the press assembly including opposing pinch rollers to continuously compress the overlapping edges of the cured EPDM membranes as the EPDM membranes pass between the pinch rollers thereby continuously securing the overlapping cured EPDM membranes together to form a continuous seam and a composite roofing membrane of predetermined width and indefinite length; and
   a storage station for continuously reeling the composite roofing membrane.

2. The apparatus of claim 1 wherein the supply station includes a supply roll containing cured EPDM membrane of indefinite length and selected width and a tensioning device to maintain a constant tension on the cured EPDM membrane as the membrane is fed from the supply roll to the seaming station.

3. The apparatus of claim 2 wherein the tensioning device includes a support roll that supports the cured EPDM membrane as the membrane is fed from the supply roll and a tensioning roll pivotally connected to the supply station to maintain a downward pressure on the cured EPDM membrane between the supply roll and the support roll.

4. The apparatus of claim 3 wherein the supply stations are arranged in an alternating overlapping arrangement.

5. The apparatus of claim 3 wherein the supply stations are arranged in a step-wise arrangement.

6. The apparatus of claim 1 wherein the device includes a plurality of hot air guns to heat the area of overlap to weld the overlapping cured EPDM membranes together and form a seam.

7. The apparatus of claim 1 wherein the device includes an adhesive applicator for applying adhesive between the overlapping wide panels of cured EPDM membrane.

8. The apparatus of claim 1 wherein the storage station includes a rotatable take-up roll onto which the composite roofing membrane is rolled for storage purposes.

9. An apparatus for continuously seaming wide panels of cured EPDM membrane to form a composite roofing membrane of predetermined width and indefinite length comprising:
   at least two supply stations for providing a selected length of cured EPDM membrane in the direction of a seaming station, each supply station including a supply roll of cured EPDM membrane wound on a mandrel positioned in overlapping relation to an adjacent mandrel for supplying and simultaneously positioning indefinite length cured EPDM membrane in an overlapping relationship along the length of the EPDM membrane;
   wherein the seaming station includes a frame member supporting a press assembly and a device for seaming the overlapping length of cured EPDM membranes, the press assembly including opposing pinch rollers to continuously compress the overlapping edges of the cured EPDM membranes as the EPDM membranes pass between the pinch rollers thereby continuously securing the overlapping cured EPDM membranes together to form a continuous seam and a composite roofing membrane of predetermined width and indefinite length; and
   a storage station for continuously reeling the composite roofing membrane.

10. The apparatus of claim 9 wherein the supply station includes a supply roll containing cured EPDM membrane of indefinite length and selected width and a tensioning device to maintain a constant tension on the cured EPDM membrane as the membrane is fed from the supply roll to the seaming station, wherein the tensioning device includes a support roll that supports the cured EPDM membrane as the membrane is fed from the supply roll and a tensioning roll pivotally connected to the supply station to maintain a downward pressure on the cured EPDM membrane between the supply roll and the support roll.

11. The apparatus of claim 9 wherein the supply stations are arranged in an alternating overlapping arrangement.

12. The apparatus of claim 9 wherein the supply stations are arranged in a step-wise arrangement.

13. The apparatus of claim 9 wherein the apparatus includes a plurality of hot air guns to heat the area of overlap to weld the overlapping length of cured EPDM membranes together and form a seam.

14. The apparatus of claim 9 wherein the apparatus includes an adhesive applicator for applying adhesive between the overlapping wide panels of cured EPDM membrane.

15. An apparatus for continuously seaming wide panels of cured EPDM membrane to form a composite roofing membrane of predetermined width and indefinite length comprising:
   at least two supply stations, each supply station including a supply roll of cured EPDM membrane wound on a mandrel positioned in overlapping relation to an adjacent mandrel for supplying and simultaneously positioning indefinite length cured EPDM membrane in an overlapping relationship along the length of the EPDM membrane;
   a seaming station including a frame member supporting a press assembly and a device for seaming the length of the overlapping cured EPDM membranes, the press assembly including directly opposing pinch rollers to continuously compress the overlapping edges of the cured EPDM membranes as the EPDM membranes pass between the pinch rollers thereby continuously securing the overlapping cured EPDM membranes together to form a continuous seam and a composite roofing membrane of predetermined width and indefinite length; and
   a storage station for continuously reeling the composite roofing membrane.

16. The apparatus of claim 15 wherein the supply station includes a supply roll containing cured EPDM membrane of indefinite length and selected width and a tensioning device to maintain a constant tension on the cured EPDM membrane as the membrane is fed from the supply roll to the seaming station, wherein the tensioning device includes a support roll that supports the cured EPDM membrane as the membrane is fed from the supply roll and a tensioning roll pivotally connected to the supply station to maintain a downward pressure on the cured EPDM membrane between the supply roll and the support roll.

17. The apparatus of claim 15 wherein the supply stations are arranged in an alternating overlapping arrangement.

18. The apparatus of claim 15 wherein the supply stations are arranged in a step-wise arrangement.

19. The apparatus of claim 15 wherein the apparatus includes a plurality of hot air guns to heat the area of overlap to weld the overlapping length of cured EPDM membranes together and form a seam.

20. The apparatus of claim 15 wherein the apparatus includes an adhesive applicator for applying adhesive between the overlapping wide panels of cured EPDM membrane.

\* \* \* \* \*